US012789970B2

(12) United States Patent
Bigeard et al.

(10) Patent No.: US 12,789,970 B2
(45) Date of Patent: Nov. 10, 2026

(54) STRUCTURAL ARRANGEMENT FOR AN ELONGATED NOSE REGION OF A ROTARY-WING AIRCRAFT

(71) Applicants: AIRBUS HELICOPTERS DEUTSCHLAND GMBH, Donauwörth (DE); AIRBUS HELICOPTERS, Marignane Cedex (FR)

(72) Inventors: Antoine Bigeard, Velaux (FR); Michel Pouyaud, Marseilles (FR); Axel Fink, Donauwörth (DE)

(73) Assignees: AIRBUS HELICOPTERS, Marignane Cedex (FR); AIRBUS HELICOPTERS DEUTSCHLAND GMBH, Donauworth (DE)

( * ) Notice: Subject to any disclaimer, the term of this patent is extended or adjusted under 35 U.S.C. 154(b) by 0 days.

(21) Appl. No.: 18/943,395

(22) Filed: Nov. 11, 2024

(65) Prior Publication Data

US 2025/0229887 A1 Jul. 17, 2025

(30) Foreign Application Priority Data

Jan. 12, 2024 (EP) .................................... 24315009

(51) Int. Cl.
*B64C 1/06* (2006.01)
*B64C 27/04* (2006.01)

(52) U.S. Cl.
CPC ............ *B64C 1/0683* (2020.01); *B64C 27/04* (2013.01)

(58) Field of Classification Search
CPC ........... B64C 1/04; B64C 1/06; B64C 1/0683; B64C 1/36
See application file for complete search history.

(56) References Cited

U.S. PATENT DOCUMENTS

| | | | | |
|---|---|---|---|---|
| 5,242,132 A * | 9/1993 | Wukowitz | ............. | B64C 35/00 244/105 |
| 5,377,934 A | 1/1995 | Hill | | |
| 9,688,381 B2 | 6/2017 | Fink | | |

(Continued)

FOREIGN PATENT DOCUMENTS

| | | |
|---|---|---|
| EP | 1813527 B1 | 8/2008 |

OTHER PUBLICATIONS

European Search Report for European Application No. EP 24315009.1, Completed by the European Patent Office, Dated May 23, 2024, 7 pages.

*Primary Examiner* — Joshua D Huson
*Assistant Examiner* — Anna L. Gordon
(74) *Attorney, Agent, or Firm* — Brooks Kushman P.C.

(57) ABSTRACT

A structural arrangement for an elongated nose region of a rotary-wing aircraft, including a nose structure that comprises an outer shell with a first shell section and a second shell section arranged diametrically opposed thereto; a first frame; a second frame that is longitudinally spaced apart from the first frame; at least two longitudinal beams which extend on the second shell section between the first frame and the second frame; at least one nose structure floor supported by the at least two longitudinal beams inside of the nose structure; and a center wall that is arranged between the nose structure floor 360 and the first shell section and that extends from the first frame to the second frame.

20 Claims, 5 Drawing Sheets

(56) References Cited

U.S. PATENT DOCUMENTS

| | | | | |
|---|---|---|---|---|
| 11,697,486 | B2 * | 7/2023 | Carlson | B64C 1/065 244/119 |
| 2008/0023582 | A1 | 1/2008 | Payen | |
| 2008/0023583 | A1 | 1/2008 | Payen | |
| 2013/0146710 | A1 * | 6/2013 | Bernadet | B64C 25/14 244/119 |
| 2015/0122940 | A1 | 5/2015 | Mairou et al. | |
| 2015/0183505 | A1 * | 7/2015 | Fink | B64C 1/06 244/119 |
| 2017/0209318 | A1 * | 7/2017 | Schroeder | F16M 13/022 |
| 2020/0231282 | A1 | 7/2020 | Ivans | |
| 2022/0126977 | A1 * | 4/2022 | Boehme | B64C 1/36 |
| 2022/0255159 | A1 * | 8/2022 | Amante | H01M 10/625 |

* cited by examiner

STRUCTURAL ARRANGEMENT FOR AN ELONGATED NOSE REGION OF A ROTARY-WING AIRCRAFT

CROSS-REFERENCE TO RELATED APPLICATION

This application claims priority to European patent application No. EP 24315009.1 filed on Jan. 12, 2024, the disclosure of which is incorporated in its entirety by reference herein.

TECHNICAL FIELD

The present technology relates to a structural arrangement for an elongated nose region of a rotary-wing aircraft. The present technology also relates to a rotary-wing aircraft comprising such a structural arrangement.

BACKGROUND

A "long" nose, i.e., an elongated nose region of an aircraft is a result of the attempt to increase the number of equipment units ahead of the helicopter's center of gravity to manage overall balance of the aircraft. By way of example, an elongated nose region may have a length longer than its width. Some already known structural arrangement for the aircraft are the subfloor structure incorporating beams, flanges or walls, and a floor, as well as a shell with openings between the frames.

Document EP 1 813 527 B1 describes a composite anti-crash structure with lateral restraint for aircraft. The structure has hollow profiles extending remotely and with respect to a shroud. The profiles are fixed to a flange or a wall and are arranged to serve as a support to an upper part of a beam, where the upper part is separated from the shroud following the rupture of the beam. A bend wall delimiting a fuel tank is supported against the beam and transmits a lateral thrust to the beam. A composite anti-crash structure with controlled buckling for an aircraft is described in document US 2008/0023582 A1.

Document U.S. Pat. No. 9,688,381 B2 describes a subfloor structure with an integral hull, for a rotary wing aircraft. The subfloor structure comprises an integral subfloor hull that defines in one-piece, upward web portions acting as longerons and a bottom central portion. The subfloor structure is useful for rotary wing aircrafts such as helicopters, and is e.g., made of composite and/or light alloy such as aluminum.

However, none of the prior art documents describe a structural arrangement for an elongated nose region of a rotary-wing aircraft. Facing an extension of a helicopter nose and an increase of equipment units installed there into, the structural arrangement of the nose proves particularly challenging.

Document U.S. Pat. No. 5,377,934 A describes a method of converting an existing helicopter airframe, such as a UH-1H/V or a UH-1D, to a special purpose use such as, for example, a gunship or a firefighter, and a helicopter constructed thereby. Modifying the aircraft involves stripping the entire shell from the basic boxlike airframe, removing all the equipment and accessories, and re-assembling the aircraft with a slimmer profile, reduced weight, and improved performance. However, the document does not describe a structural composition that is required for the longitudinal extension of the nose. The documents US2008023583 and US2015122940 were also cited.

SUMMARY

It is, therefore, an objective to provide a new structural arrangement for an elongated nose region of a rotary-wing aircraft that has an improved dynamic behavior, an economic space allocation, and an ergonomic accessibility of the equipment. The objective is solved by a structural arrangement for an elongated nose region of a rotary-wing aircraft.

More specifically, a structural arrangement for an elongated nose region of a rotary-wing aircraft includes a nose structure that comprises an outer shell, a first frame and a second frame, at least two longitudinal beams, at least one nose structure floor, and a center wall. The outer shell comprises a first shell section and a second shell section that is arranged diametrically opposed to the first shell section. Thus, the second shell section is arranged diametrically opposed to the first shell section relatively the longitudinal axis (X). In an embodiment, the outer shell has a first shell section located at and covering an upper portion of the nose structure and the second shell section is located at a lower position of the nose structure. The second frame is longitudinally spaced apart from the first frame. The at least two longitudinal beams extend on the second shell section between the first frame and the second frame. The at least one nose structure floor is supported by the at least two longitudinal beams inside of the nose structure. The center wall is arranged between the nose structure floor and the first shell section. Furthermore, the center wall extends from the first frame to the second frame.

Advantageously, the inventive structural arrangement increases the structural efficiency by increasing the overall stiffness, reducing the mass, and increasing the multiple use of the structural members whilst ensuring optimal equipment integration and accessibility capabilities. Such structural arrangement is particularly distinctive in its use of a center wall arranged between the frames, floor, and shells, and more especially covering the diagonal path between the front frame at a floor level and rear frame at an upper level. Preferably, the specific proposed structural arrangement can also be used as a segregation mean between equipment units.

Illustratively, the nose structure floor may define a floor plane. The outer shell incorporates an upper shell above the floor plane as the first shell section and a lower shell below the floor plane as the second shell section. The outer shell is attached to the first frame and the second frame, i.e., the front frame and the rear frame, as well as the center wall.

By way of example, the center wall is essentially allocated within a plane of symmetry of the helicopter that is perpendicular to a transversal axis (i.e., an axis that extends between the starboard side and the portside of the helicopter). The center wall is spanning the distance between the front frame and the rear frame. More specifically, the center wall is at least partially attached to the nose structure floor, and more especially, at a front portion of the floor, i.e., a front floor close to the front frame. The center wall is illustratively attached to the upper portion of the front frame and the upper portion of the rear frame. If desired, the center wall is also attached to the front frame at a floor level, i.e., the level near the floor plane. Illustratively, the center wall covers a diagonal path from the front frame at the floor level to the rear frame at an upper level.

Advantageously, the center wall that interconnects the first frame and the second frame, i.e., the front frame and the rear frame, as well as the at least one nose structure floor increases the overall pitch stiffness of the elongated nose region. Moreover, the overall diagonalization or triangularization i.e., forming a path that is roughly triangular shaped, reduces the height of the longitudinal beams since the inertia of the longitudinal beams and their inherent bending stiffness is no longer the driving parameter of the overall nose pitch bending stiffness.

An efficient overall bending (pitch) stiffness is deemed crucial for the dynamic behavior of a "long" nose. The drastic increase of the overall sectional working height (corresponds to the whole height of the nose instead of just the longitudinal beam's height) further allows reducing the weight of the longitudinal beams. As a result, a reduction of the longitudinal beam's height is achieved, which could increase the integration volume of the equipment within the nose or below the nose. Additionally, due to the global triangularization, the longitudinal beams can be designed for their local structural duties, such as providing floor support.

Illustratively, the inner structure of the nose incorporates the front frame, the rear frame, the center wall, and a subfloor structure. The subfloor structure is formed within the lower perimeter, i.e., the lower shell or the second shell section of the nose between the front frame and the rear frame. The subfloor structure includes the at least two longitudinal beams and the at least one nose structure floor. By way of example, the at least two longitudinal beams are essentially but not necessarily parallel to each other, and on top of those longitudinal beams the at least one nose structure floor defines the floor plane.

By way of example, the upper shell features two lateral access openings between the front frame and the rear frame, one at each side of the helicopter, covered by preferably hinged doors or, alternatively, removable screwed hatches. The center wall, thus, may serve for supporting the lateral doors.

If desired, the upper shell may feature a center post skin between the openings, which is attached to the center wall. Therefore, the center wall may further serve for transversally stiffening and strengthening the center post skin, especially against bird impacts. Furthermore, the upper shell portions and more especially the center post skin may increase the overall torsion stiffness.

Illustratively, equipment units may be attached on top of the nose structure floor and aside of the center wall. More specifically, the center wall can be shaped for equipment segregation to better serve the purpose of attaching equipment modules and to diminish common failures associated with an opened nose avionic bay.

By way of example, the nose for housing equipment units is composed of the inner structural elements described above, the outer shells, and a radome.

According to one aspect, the structural arrangement comprises a radome. The radome is attached to the nose structure. By way of example, the radome may be a housing sheltering the antenna assembly of a radar set especially on an airplane.

Preferably, the radome is attached to the first frame. Furthermore, the second frame is attachable to a fuselage of a rotary-wing aircraft.

According to one aspect, the center wall is attached to the nose structure floor.

According to one aspect, the center wall is connected to an extension member that is attached to the first frame at a frame section that is close to the second shell section. Thus, the frame section is closer to the second shell section than from the first second shell section.

According to one aspect, the center wall forms a diagonal path between the first frame and the second frame. Preferably, the diagonal path describes a trajectory from down to top in positive direction along the longitudinal axis, meaning from a lower vertical allocation at the first frame position to an upper vertical allocation at the second frame position.

According to one aspect, the center wall is attached to the first frame at a first attachment region that is close to the first shell section. Thus, the first attachment region is closer to the first shell section than from the second shell section. In embodiments the first attachment region is arranged against the first shell section.

Preferably, the center wall is attached to the second frame only at a second attachment region that is close to the first shell section.

According to one aspect, the center wall is attached to the first frame at a third attachment region that is spaced apart from the first attachment region and close to the nose structure floor. Thus, the third attachment region is closer to the nose structure floor than from the first attachment region and upper shell section. In embodiments the third attachment region is arranged flush with the nose structure floor.

According to one aspect, the center wall is adapted to support one or more equipment units.

According to one aspect, an equipment compartment is formed on each longitudinal side of the center wall between the nose structure floor, the first shell section and the center wall, and wherein each equipment compartment is accessible via an associated cut-out provided in the first shell section.

Preferably, the center wall separates two equipment compartments with associated cut-outs from each other.

According to one aspect, the associated cut-outs are separated from each other at the first shell section by a center post skin implemented as part of the first shell section. Furthermore, the center wall is attached to the center post skin.

Preferably, the structural arrangement further comprises an access door mounted to the associated cut-out for closing the equipment compartment.

According to one aspect, the center wall is a closed wall and the first and second frames are closed bulkheads providing a physical segregation between the two equipment compartments. Preferably, the center wall is delimited therein by the first and second frames, the first shell section, and the floor.

The present technology further provides a rotary-wing aircraft that comprises the structural arrangement described above.

BRIEF DESCRIPTION OF THE DRAWINGS

Embodiments are outlined by way of example in the following description with reference to the attached drawings. In these attached drawings, identical or identically functioning components or elements are labeled with identical reference numbers and characters and are, consequently, only described once in the following description.

DETAILED DESCRIPTION

Figure 1:
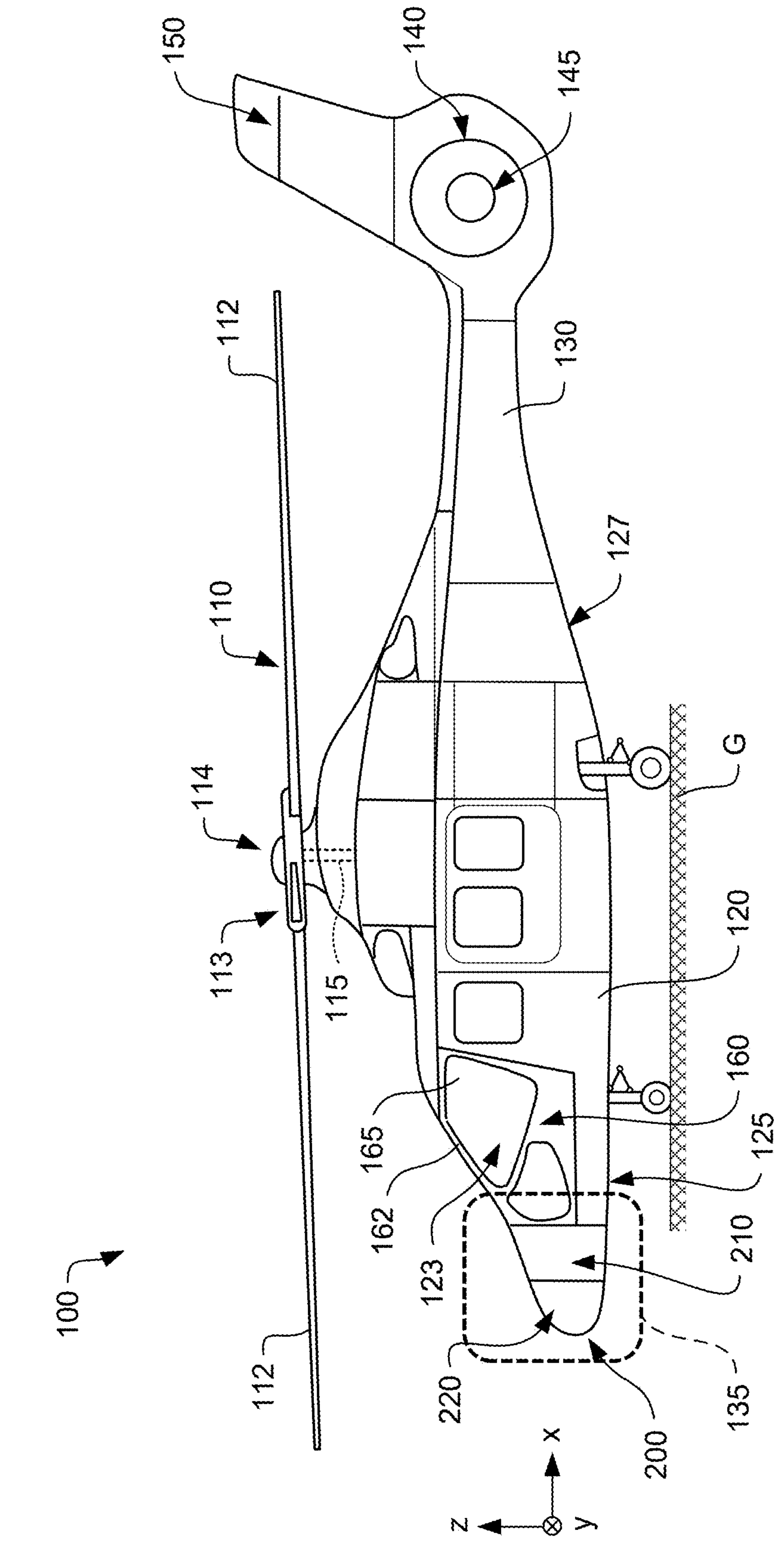
FIG. 1 is a side view of an illustrative rotary-wing aircraft with an elongated nose region.

FIG. 1 shows an illustrative rotary-wing aircraft 100 having at least one main rotor 110. As shown in FIG. 1, the rotary-wing aircraft 100, which is sometimes also referred to as rotorcraft 100, is illustrated as a helicopter. Thus, for purposes of simplicity and clarity, the rotorcraft 100 may hereinafter be referred to as the "helicopter" 100.

Illustratively, the at least one main rotor 110 comprises a single multi-blade rotor which provides lift and forward or backward thrust during operation. The multi-blade rotor 110 comprises a plurality of rotor blades 112 that are mounted at an associated rotor head 114 with a rotor hub 113 to a rotor shaft 115, which rotates in operation of the helicopter 100 around an associated rotor axis.

Illustratively, helicopter 100 has a fuselage 120 that forms an airframe of the helicopter 100. The fuselage 120 is connected to a suitable landing gear and illustratively forms a front fuselage 125 having a cabin 123 and a rear fuselage 127. The rear fuselage 127 is connected to a tail boom 130.

By way of example, helicopter 100 includes at least one counter-torque device 140 configured to provide counter-torque during operation, i. e. to counter the torque created by rotation of the multi-blade rotor 110 for purposes of balancing the helicopter 100 in terms of yaw. The at least one counter-torque device 140 is illustratively provided at an aft section of the tail boom 130 and may have a tail rotor 145. If desired, the tail rotor 145 may be shrouded, as illustrated. The aft section of the tail boom 130 may further include a fin 150.

Illustratively, an elongated nose region 135 is located at the front of the front fuselage 125. The elongated nose region 135 is provided with a structural arrangement 200. The structural arrangement 200 for the elongated nose region 135 includes a nose structure 210.

Illustratively, the structural arrangement 200 may include a radome 220 that is attached to the nose structure 210. As shown in FIG. 1, the radome 220 may be attached to the front of the nose structure 210, if desired.

The fuselage 120 includes a canopy 160 arranged at the front fuselage 125. The canopy 160 is connected to the nose structure 210. A plane of symmetry of the helicopter 100 is spanned by a longitudinal axis x and a vertical axis z. For simplicity and clarity, the plane of symmetry may be also referred to as "xz-plane."

In some implementations, the portside and the starboard side of the helicopter 100 may be mirror images. Therefore, and for simplicity and clarity, FIG. 1 illustratively shows the portside of the helicopter 100 positioned on ground G.

By way of example, the canopy 160 includes windshields 165 mounted in front of the cabin 123 and arranged symmetrically with respect to the xz-plane. Furthermore, a canopy center post 162 is illustratively arranged between the two windshields 165 on the xz-plane.

Figure 2:
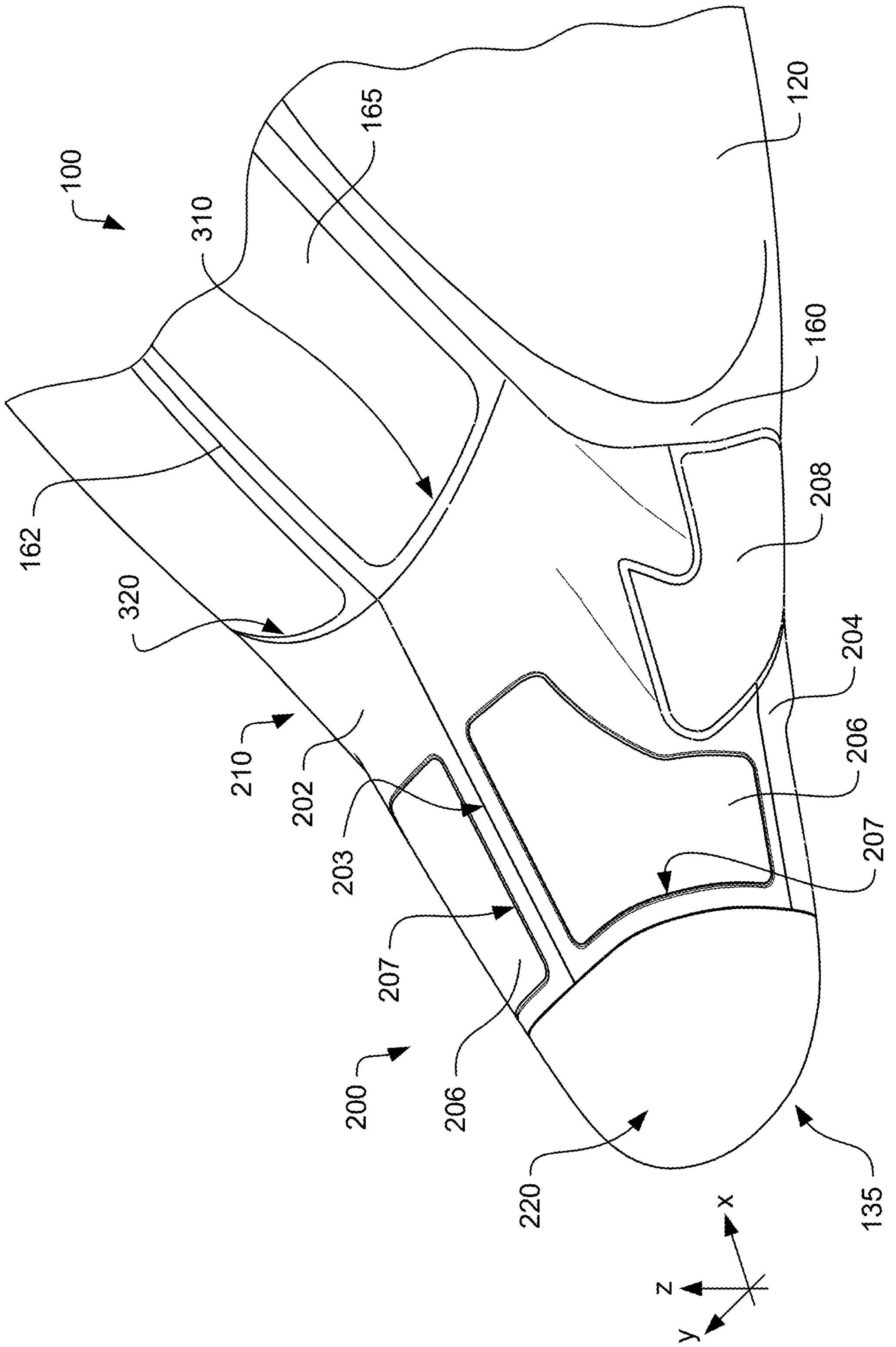
FIG. 2 is a diagram of an illustrative elongated nose region attached to the front fuselage of the rotary-wing aircraft of FIG. 1.

FIG. 2 shows the elongated nose region 135 of the helicopter 100 of FIG. 1 and a portion of the fuselage 120. As shown in FIG. 2, the structural arrangement 200 for the elongated nose region 135 includes the nose structure 210. The structural arrangement 200 may further include the radome 220 that is attached to the nose structure 210. By way of example, the nose structure 210 is arranged at the front of fuselage 120. The fuselage 120 is shown in FIG. 2 with the canopy 160 and two windshields 165 that are separated by the canopy center post 162.

Illustratively, the nose structure 210 comprises an outer shell 202, 204 with a first shell section 202 and a second shell section 204 that is arranged diametrically opposed to the first shell section 202. In view of their relative positions, the first shell section 202 may be referred to as "upper shell", "upper outer shell", or "upper shell section" 202 located at and covering an upper portion of the nose structure 210, while the second shell section 204 may be referred to as "lower shell", "lower outer shell", or "lower shell section" 204 located at a lower or bottom position of the nose structure 210 and is diametrically opposed to the first shell section 202. It should be noted that an upper portion of the nose structure 210 and a lower portion of the nose structure 210 may not be equally divided.

Illustratively, the upper shell section 202 is interconnected at its rear perimeter (i.e., at the location that is in x-axis direction closest to the windshields 165) to the canopy 160. Preferably, a center post skin 203 is implemented as part of the upper shell section 202. The center post skin 203 is allocated on the xz-plane and visually an extension of the canopy center post 162.

An elongated nose region's left-hand side 310 (i.e., on the portside of helicopter 100) and an elongated nose region's right-hand side 320 (i.e., on the starboard side of helicopter 100) are respectively located on the left and right sides of the center post skin 203. The left-hand side 310 and the right-hand side 320 of the elongated nose region 135 are essentially mirror images with respect to the center post skin 203, and thus, for simplicity and clarity, the elongated nose region left-hand side 310 will be described in detail below as representative of the elongated nose region 135.

By way of example, cut-outs 207 are provided in the upper shell section 202 of the outer shell 202. Access doors 206 are mounted to the associated cut-outs 207 for closing equipment compartments (e.g., equipment compartments 215 of FIG. 3) inside the outer shell 202, 204.

As shown in FIG. 2, the upper shell section 202 includes two access doors 206 installed on two associated cut-outs 207, respectively. The two access doors 206, as well as the two associated cut-outs 207, are respectively located on each side of the helicopter 100 with respect to its plane of symmetry. Illustratively, the associated cut-outs 207 are separated from each other at the upper shell section 202 by the center post skin 203. The center post skin 203 may be implemented as part of the upper shell section 202. If desired, the center wall 370 may be attached to the center post skin 203.

Furthermore, a lateral window 208 is illustratively positioned at a lower position on the elongated nose region's left-hand side 310. The lateral window 208 may be used to improve the pilot's field of view. Correspondingly, an additional lateral window 208 may be mounted at a corresponding lower position on the elongated nose region's right-hand side 320.

Figure 3:
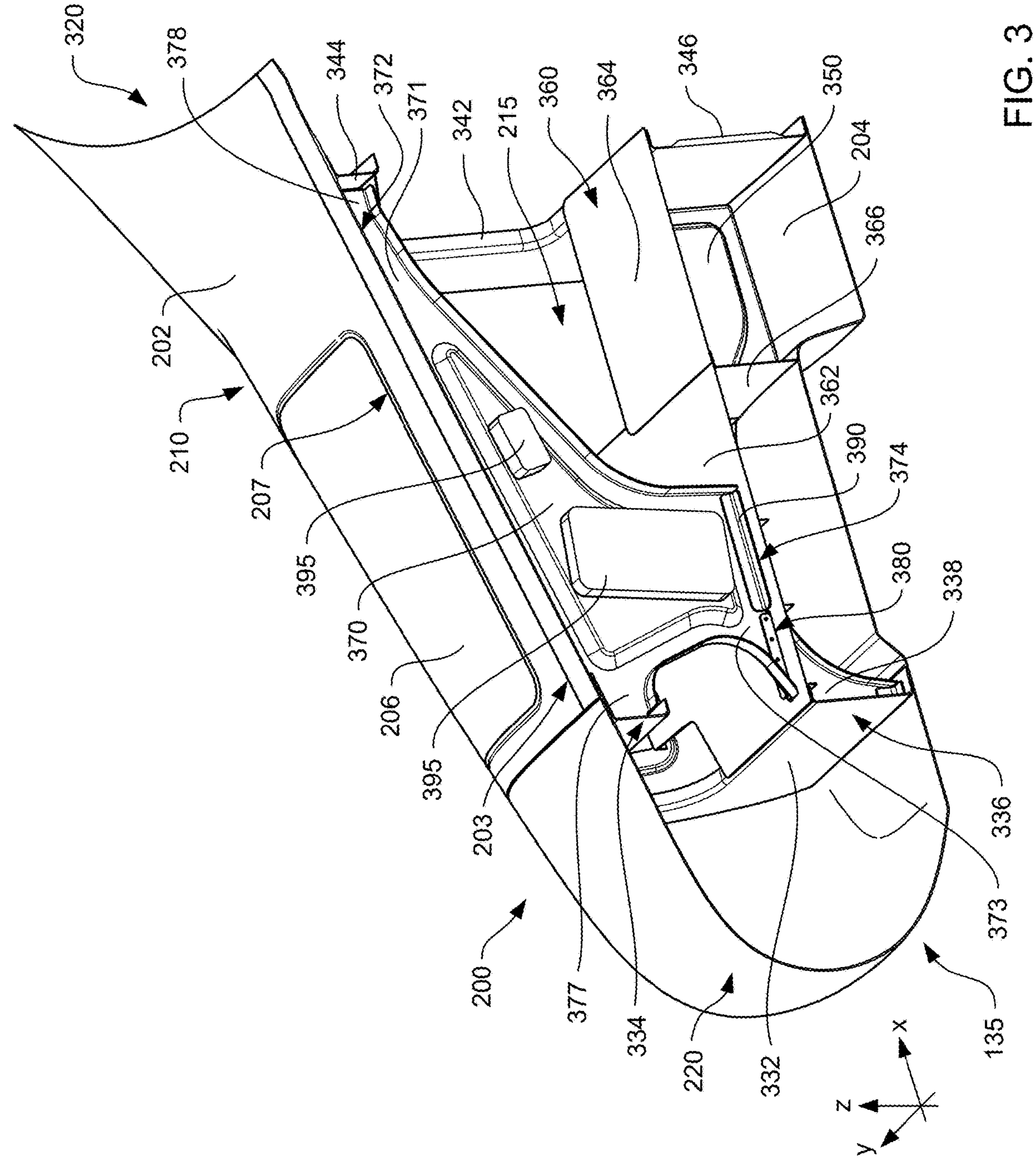
FIG. 3 is an enlarged sectional view of the illustrative elongated nose region of FIG. 2.

FIG. 3 is a sectional view of the elongated nose region 135 of the helicopter 100 of FIG. 1 that shows the inner structure of the structural arrangement 200 on the elongated nose region's right-hand side 320 with the center post skin 203.

The left-hand side 310 and the right-hand side 320 of the elongated nose region 135 are essentially mirror images with respect to the center post skin 203, and thus, for simplicity and clarity, the elongated nose region right-hand side 320 will be described in detail below as representative of the elongated nose region 135.

As shown in FIG. 3, the structural arrangement 200 for the elongated nose region 135 includes the nose structure 210. In some implementations, the structural arrangement 200 may include a radome 220 that is attached to the nose structure 210. In other implementations, the structural arrangement 200 may be closed at the front of the nose structure 210 and the radome may be omitted.

The nose structure 210 includes the first shell section 202 of the outer shell and the second shell section 204 of the outer shell that is arranged diametrically opposed to the first shell section 202. The nose structure 210 further comprises a first frame 332 and a second frame 342 that is longitudinally spaced apart from the first frame 332. The first and second frames 332, 342 are preferably oriented transversally, i. e. in the yz-plane, and may, therefore, also be referred to as "the transversal frames".

When the nose structure 210 is assembled on the helicopter 100 as shown in FIG. 1, the radome 220 may be attached to the first frame 332 in the front, and the second frame 342 may be attachable to the fuselage 120 in the rear. Thus, in view of their relative positions, the first frame 332 may be referred to as "nose structure front frame", "front transversal frame", or "front frame" and the second frame 342 may be referred to as "nose structure rear frame", "rear transversal frame", or "rear frame". However, for purposes of simplicity and clarity, the first transversal frame 332 and the second transversal frame 342 are hereinafter referred to as the "front transversal frame" 332 and the "rear transversal frame" 342, respectively.

The nose structure 210 further comprises at least two longitudinal beams 350, at least one nose structure floor 360, and a center wall 370. The at least two longitudinal beams 350 extend on the lower shell section 204 between the front transversal frame 332 and the rear transversal frame 342. It should be noted that only one of the longitudinal beams 350 arranged on the elongated nose region's right-hand side 320 is shown in FIG. 3. It is understood that another one of the at least two longitudinal beams 350 may be mirror-mounted on the elongated nose region's left-hand side 310.

The at least one nose structure floor 360 is supported by the at least two longitudinal beams 350 inside of the nose structure 210. Illustratively, the at least two longitudinal beams 350 are distantly apart from each other. For example, a first longitudinal beam 350 of the at least two longitudinal beams 350 may be located in the approximate transversal center of the elongated nose region's left-hand side 310 to support the nose structure floor 360 on the left-hand side 310 of the elongated nose region 135, and a second longitudinal beam 350 of the at least two longitudinal beams 350 may be located in the approximate transversal center of the elongated nose region's right-hand side 320 to support the nose structure floor 360 on the right-hand side 320 of the elongated nose region 135.

The center wall 370 is arranged between the nose structure floor 360 and the upper shell section 202 and extends from the front transversal frame 332 to the rear transversal frame 342. Illustratively, the center wall 370 may be attached to the nose structure floor 360.

Advantageously, the center wall 370 may be arranged parallel to the xz-plane of the helicopter 100 to separate the two equipment compartments 215 with associated cut-outs 207 from each other equally.

Illustratively, the center wall 370 includes a center wall upper portion 371 and a center wall lower portion 373. The center wall upper portion 371 may be attached to the center post skin 203 at a center wall upper edge 372, to the front frame upper section 334 at a center wall upper front edge 377, and to the rear frame upper section 344 at a center wall upper rear edge 378. The center wall lower portion 373 may be attached to the front floor 362 at a center wall lower edge 374 close to the front transversal frame 332.

By way of example, the center wall 370 may be connected to an extension member 338 that is attached to the front transversal frame 332 at a frame section 336, i.e., the front frame lower section 336, that is close to the lower shell section 204.

By way of example, a lower section extension member 338 is implemented below the nose structure floor 360. The lower section extension member 338 is connected to the front lower perimeter of the center wall 370 at an interconnection region 380. The lower section extension member 338 is also connected to the front floor 362. The lower section extension member 338 may be a structural continuation of the center wall 370 below the front floor 362 and close to the front frame lower section 336. Preferably, a set of connection angles 390 are implemented to additionally interconnect the center wall 370 to the front floor 362.

Illustratively, the center wall 370 may be adapted to support one or more equipment units 395. As show in FIG. 3, two equipment units 395 are attached to the center wall 370.

In some implementations, the structural arrangement 200 comprises a radome 220 that is attached to the nose structure 210. For example, the radome 220 may be attached to the front transversal frame 332. Illustratively, the front transversal frame 332 delimits the front end of the nose structure 210 and provides for a connection perimeter of the radome 220. By way of example, equipment units, such as a radar (not shown), may be installed in the radome 220.

The rear transversal frame 342 is attachable to the fuselage 120. By way of example, the rear transversal frame 342 is allocated at the rear end portion of the nose structure 210 and may serve for the support of the outer shell 202, 204, the canopy 160 and further structural and equipment units.

Illustratively, the front transversal frame 332 includes a front frame upper section 334 and a front frame lower section 336, and the rear transversal frame 342 includes a rear frame upper section 344 and a rear frame lower section 346. The perimeter covered by the longitudinal beams 350, the nose structure floor 360, the front frame lower section 336, and the rear frame lower section 346 delimit a subfloor structure. The subfloor structure may represent one main load carrying module of the nose structure 210 which is supported by the nose structure center wall 370.

By way of example, the nose structure floor 360 extends between the front frame lower section 336 and the rear frame lower section 346. Furthermore, the nose structure floor 360 is attached to the upper ends of the longitudinal beams 350.

By way of example, the nose structure floor 360 includes a front floor 362 and a rear floor 364. A floor support member 366 is illustratively allocated within the intersection of the front floor 362 and the rear floor 364. If desired, more than one floor support members 366 may be provided.

The floor support member 366 may be located between the longitudinal beams 350 and may be connected to both longitudinal beams 350 and to the lower shell section 204. Illustratively, the longitudinal beams 350 are interconnected to the front frame lower section 336, the rear frame lower section 346 and the lower shell section 204.

Figure 4:
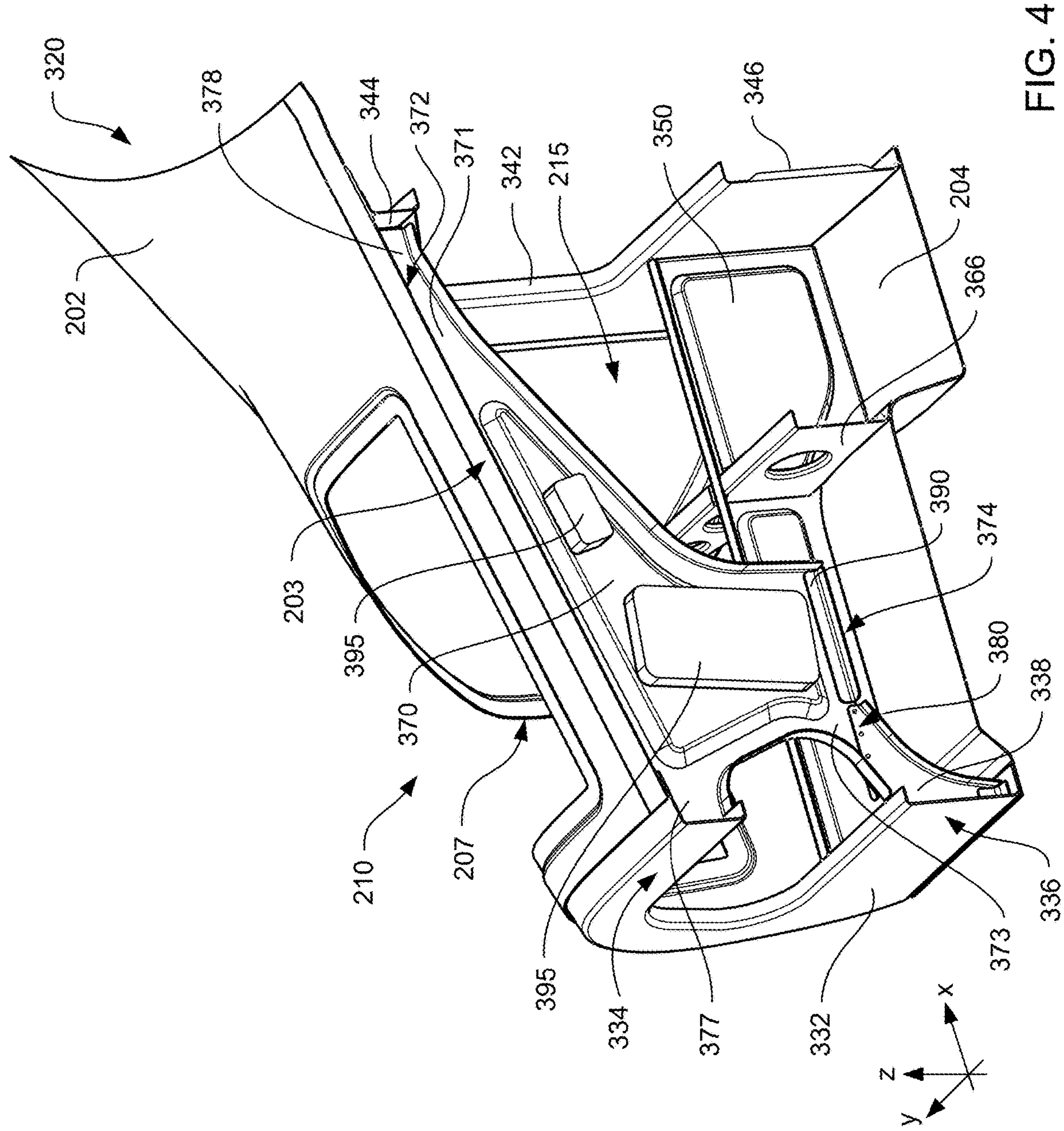
FIG. 4 is a sectional view of a nose structure for the illustrative elongated nose region of FIG. 3, in which the nose structure floor, the radome, and the access doors are omitted to show the inner structure of the nose structure.

FIG. 4 shows the nose structure 210 on the elongated nose region's right-hand side 320. The nose structure 210 has an upper shell section 202 and a lower shell section 204 that are interconnected with the front transversal frame 332 and the rear transversal frame 342. As shown in FIG. 4, the access cut-out 207 is provided on the upper shell section 202. The upper portion 371 of the center wall 370 may be attached to the center post skin 203 at the edge 372 and to the frame upper sections 334, 344 at the edges 377, 378.

Illustratively, the center wall 370 is attached to the front frame lower section 336 via the interconnection region 380 formed with the lower section extension member 338 at the center wall lower portion 373 and to the nose structure floor 360 (not show in FIG. 4) at the edge 374 via the connection angles 390. The nose structure longitudinal beam 350 and the floor support members 366 may be attached to the frame lower sections 336, 346, and to the lower shell section 204.

As shown in FIG. 4, the floor support members 366 may support the nose structure floor 360 and the lower shell section 204. If desired, the equipment units 395 are attached to the side surface of the center wall 370.

For example, the equipment compartment 215 may be formed on each longitudinal side 310, 320 of the center wall 370 between the nose structure floor 360, the upper shell section 202 and the center wall 370. If desired, each equipment compartment 215 may be accessible via one of the associated cut-outs 207 provided in the upper shell section 202.

In some implementations, the center wall 370 separates two equipment compartments 215 with associated cut-outs 207 from each other. If desired, the structural arrangement 200 may include access doors 206 mounted to the associated cut-outs 207 for closing the equipment compartments 215.

Figure 5:
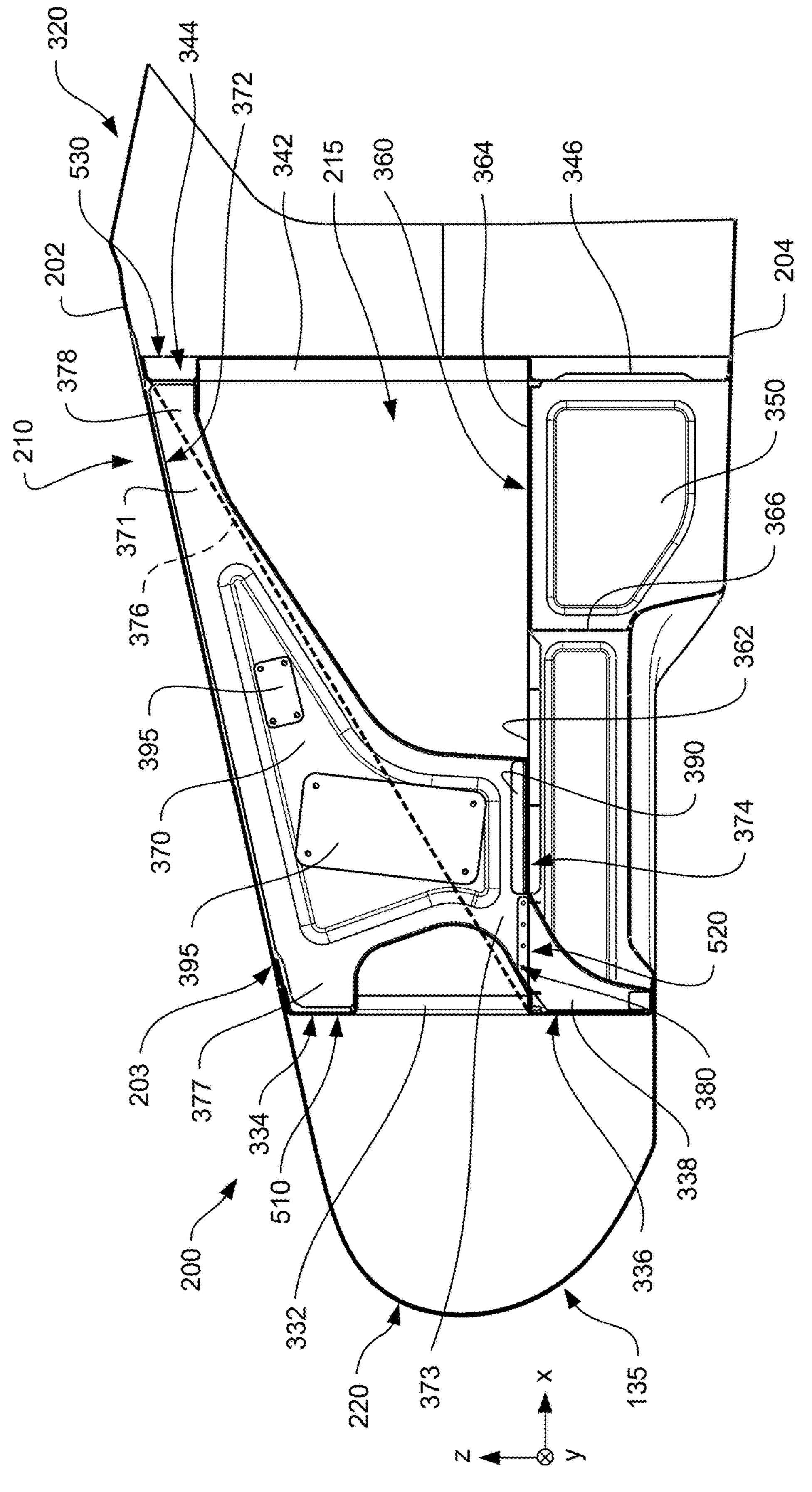
FIG. 5 is a sectional view of the side of the illustrative elongated nose region of FIG. 3.

FIG. 5 shows a sectional view of the structural arrangement 200 for the elongated nose region 135 in the xz-plane. The structural arrangement 200 includes the nose structure 210 of the elongated nose region's right-hand side 320 shown in FIG. 4. FIG. 5 also shows the radome 220 attached to the nose structure 210 and the nose structure floor 360 installed inside the nose structure 210. The nose structure floor 360 includes the front floor 362 and the rear floor 364.

In some embodiments, the center wall 370 forms a diagonal path 376 between the front transversal frame 332 and the rear transversal frame 342. More specifically, the center wall 370 is designed to cover the diagonal path 376 spanning between the front frame lower section 336 and the rear frame upper section 344.

Illustratively, the center wall 370 is attached to the front transversal frame 332 at a first attachment region 510 that is close to the upper shell section 202. If desired, the center wall 370 is attached to the rear transversal frame 342 at a second attachment region 530 that is close to the upper shell section 202. In other words, the center wall 370 forms two upper attachment regions respectively at the front transversal frame 332 and the rear transversal frame 342, whereby the two upper attachment regions may alternatively be referred to as "upper front attachment region" 510 and "upper rear attachment region" 530.

By way of example, the center wall 370 may be attached to the front transversal frame 332 at a third attachment region 520 that is spaced apart from the first attachment region 510 and close to the nose structure floor 360. In other words, the center wall 370 may form two front attachment regions that are spaced apart at the front transversal frame 332, whereby the two front attachment regions may alternatively be referred to as "upper front attachment region" 510 and "lower front attachment region" 520.

If desired, the present arrangement of the center wall 370 may form a path that is roughly triangular shaped. The triangular shape is defined by the diagonal path 376 and a longitudinal path, which is determined by the subfloor structure, i.e., the nose structure floor 360 and the longitudinal beams 350. The structural continuity of the diagonal path 376 behind the rear transversal frame 342 is provided by the canopy center post 162 shown in FIG. 2, which results in a maximization of the pitch bending stiffness of the elongated nose region 135.

It should be noted that the above described embodiments are merely described to illustrate possible implementations, but not in order to restrict the present disclosure thereto. Instead, multiple modifications and variations of the above described embodiments are possible and are parts of the claimed disclosure.

For instance, according to FIG. 2 and FIG. 3, the access cut-outs 207 on the upper shell section 202 are shown as hinged access doors 206. However, the access doors 206 may alternatively be removable screwed hatches.

Furthermore, according to FIG. 3 to FIG. 5, the lower section extension member 338 is a separated structural continuation of the center wall 370 below the front floor 362 and close to the front frame lower section 336. Nevertheless, the center wall 370 and the lower section extension member 338 may alternatively be merged into a single part.

Moreover, according to FIG. 3 to FIG. 5, a set of connection angles 390 are preferably implemented to additionally interconnect the center wall 370 to the nose structure floor 360. However, any other suitable type of connection, such as riveted connections or socket connections or others are likewise contemplated.

Finally, according to FIG. 3 to FIG. 5, two equipment units 395 are supported by the center wall 370. Nevertheless, one or more equipment units 395 may alternatively be supported by the nose structure floor 360.

REFERENCE LIST

100 rotary-wing aircraft
110 multi-blade rotor
112 rotor blade
113 rotor hub
114 rotor head
115 rotor shaft
120 fuselage
123 cabin
125 front fuselage
127 rear fuselage
130 tail boom
135 elongated nose region
140 counter-torque device
145 tail rotor
150 fin
160 canopy
162 canopy center post
165 windshield
200 structural arrangement
202 upper shell section
203 center post skin
204 lower shell section
206 access doors
207 access cut-outs
208 lateral window
210 nose structure
215 equipment compartment
220 radome
310 elongated nose region left-hand side
320 elongated nose region right-hand side
332 nose structure front transversal frame
334 front frame upper section
336 front frame lower section

338 lower section extension member
342 nose structure rear transversal frame
344 rear frame upper section
346 rear frame lower section
350 nose structure longitudinal beam
360 nose structure floor
362 front floor
364 rear floor
366 floor support members
370 center wall
371 center wall upper portion
372 center wall upper edge
373 center wall lower portion
374 center wall lower edge
376 center wall diagonal path
377 center wall upper front edge
378 center wall upper rear edge
380 interconnection region of center wall lower section and lower section extension member
390 connection angles
395 equipment units
510 upper front attachment region
520 lower front attachment region
530 upper rear attachment region
G ground
x longitudinal axis
y transversal axis
z vertical axis

What is claimed is:

1. A structural arrangement for an elongated nose region of a rotary-wing aircraft defining a longitudinal axis, including a nose structure, the nose structure comprising:

an outer shell with a first shell section and a second shell section, wherein the first shell section is located at and covers an upper portion of the nose structure, and wherein the second shell section is located at a lower position of the nose structure so that that the second shell section is arranged diametrically opposed to the first shell section relative to the longitudinal axis;

a first frame;

a second frame that is longitudinally spaced apart from the first frame;

at least two longitudinal beams which extend on the second shell section between the first frame and the second frame;

at least one nose structure floor supported by the at least two longitudinal beams inside of the nose structure; and a center wall that is arranged between the nose structure floor and the first shell section and that extends from the first frame to the second frame, wherein the center wall includes an edge extending diagonally relative to the longitudinal axis from an upper region of the second frame toward a region of the first frame that is vertically offset from the upper region of the second frame.

2. The structural arrangement of claim 1, further comprising a radome that is attached to the nose structure.

3. The structural arrangement of claim 1, wherein the center wall is attached to the nose structure floor.

4. The structural arrangement of claim 1, wherein the center wall is connected to an extension member that is attached to the first frame at a frame section that is closer to the second shell section than to the first shell section.

5. The structural arrangement of claim 1, wherein the edge extends between an upper attachment region of the center wall at the second frame and a lower attachment region of the center wall at the first frame.

6. The structural arrangement of claim 1, wherein the center wall is attached to the first frame at a first attachment region that is closer to the first shell section than to the second shell section.

7. The structural arrangement of claim 6, wherein the center wall is attached to the second frame at a second attachment region that is closer to the first shell section than to the second shell section.

8. The structural arrangement of claim 7, wherein the center wall is attached to the first frame at a third attachment region that is spaced apart from the first attachment region and closer to the nose structure floor than to the second shell section.

9. The structural arrangement of claim 1, wherein the center wall is adapted to support one or more equipment units.

10. The structural arrangement of claim 1, wherein an equipment compartment is formed on each longitudinal side of the center wall between the nose structure floor, the first shell section and the center wall, and wherein each equipment compartment is accessible via an associated cut-out provided in the first shell section.

11. The structural arrangement of claim 10, wherein the center wall separates the two equipment compartments with associated cut-outs from each other.

12. The structural arrangement of claim 11, wherein the center wall is a closed wall, and wherein the first and second frames are closed bulkheads providing a physical segregation between the two equipment compartments.

13. The structural arrangement of claim 10, wherein the associated cut-outs are separated from each other by a center post skin implemented as part of the first shell section, and wherein the center wall is attached to the center post skin.

14. The structural arrangement of claim 10, further comprising an access door mounted to the associated cut-out for closing the equipment compartment.

15. A rotary-wing aircraft comprising a structural arrangement according to claim 1.

16. A structural arrangement for an elongated nose region of a rotary-wing aircraft defining a longitudinal axis, including a nose structure, the nose structure comprising:

an outer shell with a first shell section and a second shell section, wherein the first shell section covers an upper portion of the nose structure, and wherein the second shell section is located at a lower position of the nose structure spaced from and opposed to the first shell section relative to the longitudinal axis;

a first frame;

a second frame longitudinally spaced apart from the first frame;

two longitudinal beams extending on the second shell section between the first frame and the second frame;

a nose structure floor supported by the two longitudinal beams inside the nose structure, wherein the nose structure floor is supported on upper portions of the two longitudinal beams such that the two longitudinal beams extend beneath the nose structure floor; and a center wall arranged between the nose structure floor and the first shell section, the center wall extending from the first frame to the second frame.

17. The structural arrangement of claim 16, further comprising a radome that is attached to the nose structure.

18. The structural arrangement of claim 16, wherein the nose structure floor is positioned above the two longitudinal beams and below at least a portion of the center wall.

19. The structural arrangement of claim 16, wherein the center wall forms a diagonal path between the first frame and the second frame, the center wall spanning between a front frame lower section and a rear frame upper section.

20. The structural arrangement of claim 16, wherein the center wall is attached to the first frame at an attachment region closer to the first shell section than to the second shell section.

* * * * *